United States Patent [19]

Yao et al.

[11] Patent Number: 4,691,476
[45] Date of Patent: Sep. 8, 1987

[54] VEHICLE DOOR STRUCTURE

[75] Inventors: Hiroyuki Yao, Nagoya; Yuji Okamoto, Toyota, both of Japan

[73] Assignee: Toyota Jidosha Kabushiki Kaisha, Aichi, Japan

[21] Appl. No.: 677,297

[22] Filed: Dec. 3, 1984

[30] Foreign Application Priority Data

Dec. 19, 1983 [JP] Japan ................. 58-195292

[51] Int. Cl.[4] ............................ B60J 1/17
[52] U.S. Cl. ............................ 49/374; 49/502
[58] Field of Search .......... 49/374, 227, 502, 348–352; 296/146

[56] References Cited

U.S. PATENT DOCUMENTS

| | | |
|---|---|---|
| 1,891,478 | 12/1932 | Meatheringham . |
| 2,024,773 | 12/1935 | Lohrman . |
| 2,819,066 | 1/1958 | Hadwin, Jr. ................. 49/227 |
| 2,925,268 | 2/1960 | Pierce . |
| 3,062,528 | 11/1962 | Martens ................. 49/227 |
| 3,422,574 | 1/1969 | Martens ................. 49/227 |
| 4,457,111 | 7/1984 | Koike ................. 49/502 X |

FOREIGN PATENT DOCUMENTS

| | | |
|---|---|---|
| 0040588 | 11/1981 | European Pat. Off. . |
| 2435766 | 2/1976 | Fed. Rep. of Germany . |
| 2808235 | 8/1979 | Fed. Rep. of Germany . |
| 5683520 | 11/1954 | Japan . |
| 158321 | 11/1981 | Japan ................. 49/374 |
| 56-158321 | 11/1981 | Japan . |

Primary Examiner—Kenneth J. Dorner
Assistant Examiner—Mark W. Binder
Attorney, Agent, or Firm—Parkhurst & Oliff

[57] ABSTRACT

A vehicle door structure having an exterior surface of a glass window located in a vehicle door. A door window is vertically displaceable in conjunction with a slider. The slider has a vertically extending groove into which an end portion of the door window is fitted. An adhesive is provided between the end portion of the door window and the inside of the slider to fix the door window in the groove of the slider. The upper portion of the slider closes the space in which the adhesive is filled so that the adhesive does not spread out on the upper surface of the slider, thereby preventing accumulation of foreign matter such as dust and dirt, and adding to the aesthetic appearance of the assembly.

11 Claims, 7 Drawing Figures

VEHICLE DOOR STRUCTURE

BACKGROUND OF THE INVENTION

The present invention relates generally to a vehicle door structure, and more particularly to a vehicle door structure having an exterior surface portion of a door window located in a vehicle door, such that it is almost flush with an exterior surface portion of an enclosing door frame. Further, the present invention provides an apparatus which secures more reliably a door window to a resilient member, the resilient member being attached by an adhesive substance to the door window.

This invention reduces undesirable air resistance and noise which are generated by wind passing across the exterior surface portions of the window and door frame. Further, this door structure eliminates the narrow field of vision which is present in known devices. The vehicle door structure also improves the door assembly in that it provides for a more reliable attachment between a resilient member and the door window.

An example of a known door structure is disclosed in Japanese Laid-Open Utility Model No. Sho 56-158322 (Japanese Utility Model Application No. Sho 55-58647), which is shown in FIG. 7. According to this known structure, a rear end portion 102 of a door window 100 is fixed to a slider 200 which guides the door window 100 during the vertical displacement thereof. An adhesive 50 is provided between the rear end portion 102 of the door window 100 and the slider 200 to fix the slider 200 to the door window 100. FIG. 7 shows that an upper surface 202 of the slider 200 is horizontally sectioned. The adhesive 50 is not enclosed by any portion of the slider 200, which permits the adhesive 50 to spread onto the upper surface 200 of the slider 200. When the door window 100 is displayed downwardly by any means of operation, a passenger sitting nearest to the door visually observes the upper surface 202 of the slider 200. Thus, if the adhesive 50 spreads out onto the upper surface 202 of the slider 200, dust, dirt and moisture can accumulate upon the adhesive. Further, the spreading of the adhesive is undesirable from an aesthetic standpoint as well.

SUMMARY OF THE INVENTION

The present invention was made in view of the foregoing background and to overcome the foregoing drawbacks. It is accordingly an object of this invention to provide an improved vehicle door structure, wherein the adhesive employed for fixing a door window to the slider does not spread onto undesirable surfaces of the slider.

To attain the above objects, an improved vehicle door structure according to the present invention has a swingable door frame mounted to a vehicle. The door frame has a door window affixed therein. The door window is fixed by adhesives onto a slider which guides the door window during the vertical displacement thereof. The slider has a groove into which an end of the door window is fitted, such that the window is fixed to the slider by an adhesive substance which fills the space between an end of the fitted door window and an inside portion of the slider. Further, the door window is supported firmly by the slider. More specificially, the slider has an upper portion which covers corner portions of the door window. These covered corner portions prevent the adhesive from spreading onto the upper surface of the slider. Further, the covered corner portions prevent accumulation of foreign matter on the adhesive.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
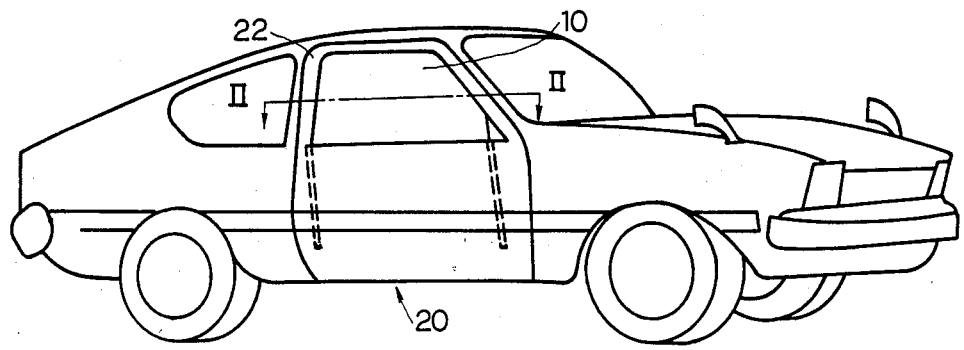
FIG. 1 is a perspective view of a vehicle body wherein a vehicle body structure according to the present invention is attached.
Figure 2:
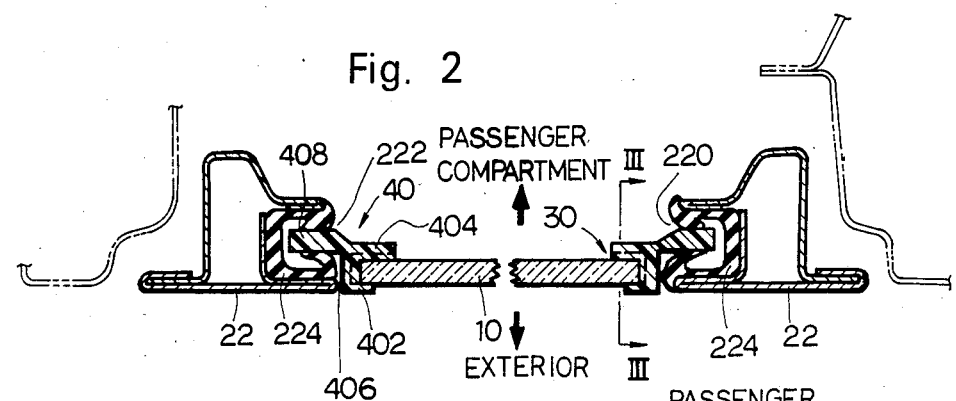
FIG. 2 is an enlarged cross-sectional view taken along the line II—II in FIG. 1.
Figure 4:
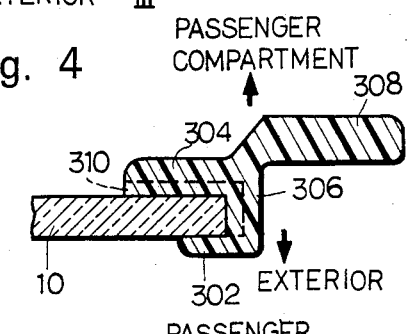
FIG. 4 is a cross-sectional view taken along the line IV—IV in FIG. 3.
Figure 5:
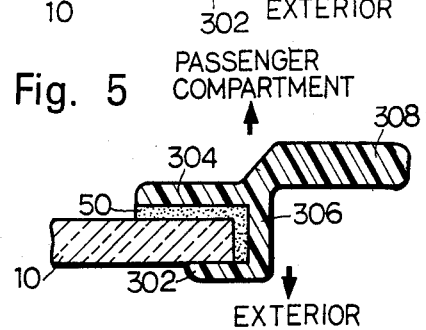
FIG. 5 is a cross-sectional view taken along the line V—V in FIG. 3.

FIG. 1 shows a perspective view of a vehicle body which utilizes a structure according to the present invention. A door window 10 is mounted such that it can be upwardly and downwardly displaced, by any known means of operation, within a door frame 22 of a door 20. FIG. 2 shows an enlarged cross-sectional view taken along the line II—II in FIG. 1. As shown in FIG. 2, the door window 10 is mounted within the door frame 22. The door frame 22 has door window guide grooves 220 and 222 at front and rear portions of the frame 22. A cushioning member 224 is provided within the grooves 220 and 222. The sliders 30 and 40 are fixed to the door window 10 at the front and rear end portions thereof. FIGS. 4 and 5 shown that the slider 30, which, for example, is made of synthetic resin, comprises an exterior extension portion 302, an interior extension portion 304, and a con necting portion or base portion 306 which connects the exterior portion 302 and the interior portion 304. The slider 30 also has an elongated front end portion 308. The exterior portion 302 of the front slider 30 extends in an almost parallel relationship with the exterior surface of the door window 10, and is almost flush with the exterior surface of the door frame 22. The interior portion 304 of the front slider 30 similarly extends in a parallel relationship with the interior surface of the door window 10. The connecting portion 306 of the slider 30 extends laterally across the door frame and connects the interior portion 304 with the exterior portion 302. The interior portion 304 of the slider 30 forwardly extends in the vehicle to form the elongated front end portion 308. The forward end of the elongated front end portion 308 is fitted into the cushioning member 224.

Similarly, a rear slider 40 can also be made of synthetic resin and comprises an exterior extension portion 402, and interior extension portion 404, a connecting portion or base portion 406, and an elongated rear end portion 408. The exterior portion 402 of the rear slider 40 extends in an almost parallel relationship with the exterior surface of the door window 10, and is almost flush with the exterior surface of the door frame 22. The interior portion 404 of the rear slider 40 extends in an almost parallel relationship with the interior surface of the door window 10. The connecting portion 406 of the rear slider 40 extends laterally across the door frame and connects the interior portion 404 with the exterior portion 402. The interior portion 404 of slider 40 extends rearwardly to form the elongated rear end portion 408. The rearward end of the elongated portion 408 fits into the groove 222 and is surrounded by the cushioning member 224.

Figure 3:
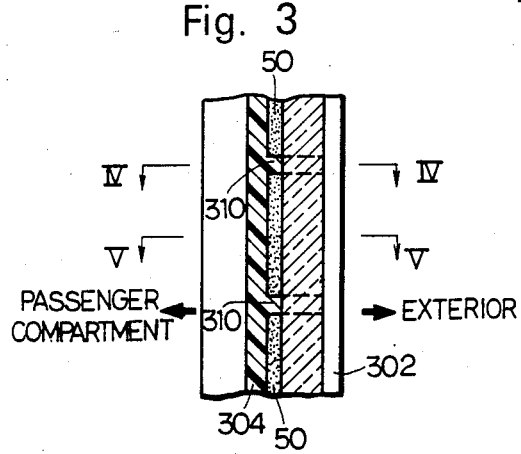
FIG. 3 is a partially enlarged cross-sectional view taken along the line III—III in FIG. 2.

The portions 304 and 306 of the front slider 30 have ribs 310 which partially surround the front portion of the door window 10. As shown in FIG. 3, a plurality of ribs 310 are separately provided at different vertical positions such that they properly locate the door window 10 within the slider 30. The front end of the door window 10 is fitted into the gap defined between the portions 302, 304 and 306 of the slider 30. leaving a recess between door window 10 and portions 304 and 306, as shown in FIG. 5 An adhesive 50, such as silicon adhesive or urethane adhesive, is fitted into the recess between the door window 10 and the portions 304 and 306, as further shown in FIG. 5. The adhesive 50 fixes the slider 30 to the front end of the door window 10. The slider 40 is similarly fixed to the rear end of the door window 10.

Figure 6:
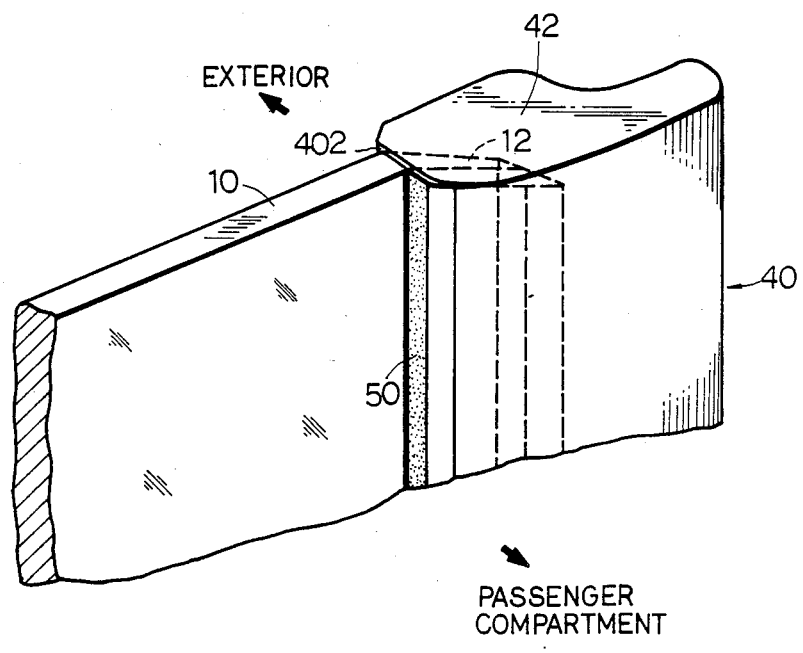
FIG. 6 is a partial perspective view which illustrates the rear portion of the vehicle door structure according to the present invention.
Figure 7:
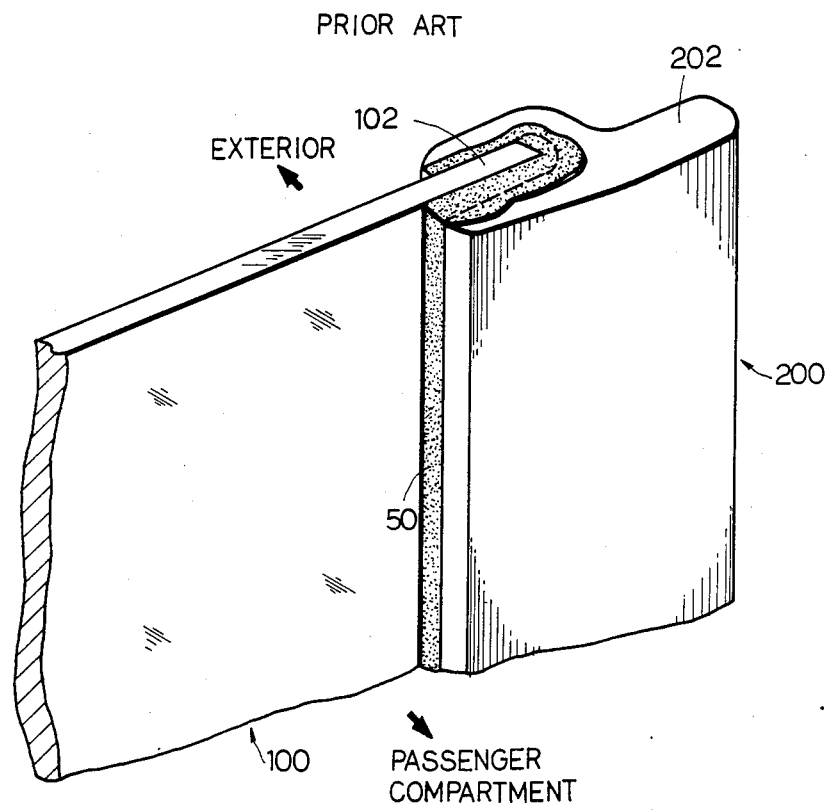
FIG. 7 is a partial perspective view of a known vehicle door structure, illustrating its rear portion.

FIG. 6 shows a partial perspective view which illustrates a portion of the vehicle door structure according to the present invention. The rearward upper corner portion 12 (i.e., the top part of the portion of the window positioned within the groove 222) of the door window 10 is inclined as shown in FIG. 6 (i.e., cut-off). The inclined corner portion 12 of the door window 10 is slidably fitted into a groove in the slider 40. The upper end surface or bridge 42 of the slider 40 is designed such that it has a flat upper surface which encloses the inclined corner portion 12 of the door window 10 underneath. The adhesive 50 which connects the slider 40 to the door window does not spread out onto the upper surface 42 of the slider 40. Hence, the undesirable features of the prior art have been obviated.

Similarly, a forward upper corner portion of a door window can be similarly surrounded by a slider such that both the forward and rearward upper corner portions of the door window prevent the adhesive 50 from spreading onto the upper end surface of the slider.

While the present invention has been described in its preferred embodiments, it is to be understood that the invention is not limited thereto, and may be otherwise embodied within the scope of the following claims.

What is claimed is:

1. A vehicle door structure, comprising:
   a door frame mounted onto a vehicle such that it opens and closes;
   a door window having a plurality of corner portions, top and bottom edges, interior and exterior surfaces, and two substantially vertical edges, at least one of said plurality of corner portions being cut-off, the door window being provided in said door frame such that said exterior surface of said door window is substantially flush with an exterior surface of said door frame; and
   a slider fixed to one of said substantially vertical edges of said door window for guiding said door window along said door frame during an upward and downward displacement thereof, said slider including a substantially vertically extending base, a pair of substantially vertically extending extensions which project laterally from said base to define a gap therebetween, and a bridge extending from an upper end of said base for part of the distance between the substantially vertical edges of the door window and bridging upper ends of said pair of extensions, an upper surface of said bridge being substantially flush with the upper end of said base and the top edge of said door window;
   wherein said one substantially vertical edge of said door window is positioned within said gap between said pair of extensions, base and bridge, said bridge and said pair of extensions cooperate to surround said at least one cut-off portion of said plurality of corner portions of the door window, and a recess between said slider and said one substantially vertical edge of said door window within said gap is filled with an adhesive, whereby said adhesive is prevented by said bridge and said pair of extensions from contacting the upper surface of said bridge, the upper end of said base, and the top edge of said door window.

2. The vehicle door structure of claim 1, wherein said pair of extensions comprises a first portion which extends in a substantially parallel relationship with an exterior surface of said door window and a second portion which extends in a substantially parallel relationship with an interior surface of said door window, said base connecting said first portion of said slider with said second portion of the slider, said slider further comprising a third portion connected with said base, such that said third portion extends in a direction which is substantially opposite to said second portion.

3. The vehicle door structure of claim 1, wherein said one of said plurality of corner portions is a rear upper corner portion.

4. The vehicle door structure of claim 1, wherein said one of said plurality of corner portions is a front upper corner portion.

5. The vehicle door structure of claim 1, wherein a first slider is fixed to a rearward end of said door window and a second slider is fixed to a forward end of said door window.

6. The vehicle door structure of claim 2, further comprising a cushioning member positioned within said door frame, the cushioning member having an opening into which the third portion of said slider slidably engages.

7. The vehicle door structure of claim 6, wherein said second portion and said base of said slider contain a plurality of horizontal, vertically separated ribs.

8. A vehicle door structure, comprising:
   a door frame mounted onto a vehicle;
   a door window having a plurality of corner portions, top and bottom edges, interior and exterior surfaces, and first and second substantially vertical edges, said plurality of corner portions including a rearward upper corner portion and a forward upper corner portion, said rearward upper corner portion and said forward upper corner portion being cut-off, the door window being provided in said door frame such that said exterior surface of said door window is substantially flush with an exterior surface of said door frame;

a first slider fixed to said first substantially vertical edge of said door window for guiding said door window along said door frame during upward and downward displacement thereof, said first slider including a first substantially vertically extending base portion, a first pair of substantially vertically extending extensions which project laterally from said first base portion to define a gap therebetween, and a first bridge portion extending form an upper end of said first base portion for part of the distance between the first and second substantially vertical edges of the door window and bridging upper ends of said first pair of extensions, an upper surface of said first bridge portion being substantially flush with the upper end of said first base portion and the top edge of said door window, said first substantially vertical edge of said door window being positioned within said gap between said first pair of extensions, first base portion and first bridge portion, said first bridge portion cooperating with said first pair of extensions to surround said cut-off rearward upper corner portion of said door window, and a recess between said first slider and said first substantially vertical edge of said door window within said gap being filled with an adhesive, whereby said adhesive is prevented by said first bridge portion and said first pair of extensions from contacting the upper surface of said first bridge portion, the upper end of said first base portion, and the top edge of said door window; and a second slider fixed to said second substantially vertical edge of said door window for guiding said door window along said door frame during upward and downward displacement thereof, said second slider including a second substantially vertically extending base portion, a second pair of substantially vertically extending extensions which project laterally from said second base portion to define a gap therebetween, and a second bridge portion extending from an upper end of said second base portion for part of the distance between the first and second substantially vertical edges of the door window and bridging upper ends of said second pair of extensions, an upper surface of said second bridge portion being substantially flush with the upper end of said second base portion and the top edge of said door window, said second substantially vertical edge of said door window being positioned within said gap between said second pair of extensions, second base portion and second bridge portion, said second bridge portion of the slider cooperating with said second pair of extensions to surround said cut-off forward upper corner portion of said door window, and a recess between said second slider and said second substantially vertical edge of said door window within said gap being filled with an adhesive, whereby said adhesive is prevented by said second bridge portion and said second pair of extensions from contacting the upper surface of said second bridge portion, the upper end of said second base portion, and the top edge of said door window.

9. The vehicle door structure of claim 8, wherein said pair of extensions comprises a first portion which extends in a substantially parallel relationship with an exterior surface of said door window and a second portion which extends in a substantially parallel relationship with an interior surface of said door window, said base portion connecting said first portion of said slider with said second portion of said slider, said slider further comprising a third portion connected with said base portion, said third portion extending in a direction which is substantially opposite to the direction of said second portion.

10. The vehicle door structure of claim 9, further comprising rearward and forward cushioning members positioned within said door frame, the cushioning members having openings into which the third portions of said sliders respectively slidably engage.

11. The vehicle door structure of claim 10, wherein said second portion and said base portion of said first slider include a plurality of horizontal, vertically separated ribs which surround said first substantially vertical edge of said door window, and wherein said second portion and said base portion of said second slider include a plurality of horizontal, vertically separated ribs which surround said second substantially vertical edge of said door window.

* * * * *